US009007177B2

(12) United States Patent
Won et al.

(10) Patent No.: US 9,007,177 B2
(45) Date of Patent: Apr. 14, 2015

(54) APPARATUS AND METHOD FOR GENERATING BEHAVIOR PATTERN

(75) Inventors: Soo-seob Won, Daejeon (KR); Dong-ju Kim, Daejeon (KR); Yeong-il Seo, Daejeon (KR)

(73) Assignee: KT Corporation, Seongnam (KR)

( * ) Notice: Subject to any disclaimer, the term of this patent is extended or adjusted under 35 U.S.C. 154(b) by 10 days.

(21) Appl. No.: 13/525,787

(22) Filed: Jun. 18, 2012

(65) Prior Publication Data
US 2012/0319820 A1 Dec. 20, 2012

(30) Foreign Application Priority Data

Jun. 16, 2011 (KR) ........................ 10-2011-0058411

(51) Int. Cl.
*H04Q 5/22* (2006.01)
*G06Q 10/08* (2012.01)
(52) U.S. Cl.
CPC .................................. *G06Q 10/087* (2013.01)

(58) Field of Classification Search
USPC ........................................................ 340/10.1
See application file for complete search history.

(56) References Cited

U.S. PATENT DOCUMENTS

| 2005/0184150 A1* | 8/2005 | Welte et al. .................... 235/385 |
| 2009/0150217 A1* | 6/2009 | Luff ................................ 705/10 |
| 2009/0206151 A1* | 8/2009 | Morita .......................... 235/375 |

* cited by examiner

*Primary Examiner* — Hai Phan
*Assistant Examiner* — Zhen Y Wu
(74) *Attorney, Agent, or Firm* — Sughrue Mion, PLLC

(57) ABSTRACT

A method for generating a behavior pattern based on information from radio frequency identification tags is disclosed. The method includes identifying a plurality of radio frequency identification tags, generating a radio frequency identification group that corresponds to the plurality of radio frequency identification tags, receiving behavior information that corresponds to the radio frequency identification group from a user device, matching the radio frequency identification group with the behavior information, generating a behavior pattern corresponding to the matched radio frequency identification group and the behavior information, and storing the behavior pattern in a database.

20 Claims, 4 Drawing Sheets

APPARATUS AND METHOD FOR GENERATING BEHAVIOR PATTERN

CROSS-REFERENCE TO RELATED PATENT APPLICATION

This application claims priority from Korean Patent Application No. 10-2011-0058411, filed on Jun. 16, 2011 in the Korean Intellectual Property Office, the entire disclosures of which are incorporated herein by reference.

BACKGROUND

1. Field

Apparatuses and methods consistent with exemplary embodiments relate to an apparatus and a method for generating a behavior pattern, and an apparatus and a method for providing related information associated with the behavior pattern based on information from radio frequency identification tags.

2. Description of the Related Art

A radio frequency identification (RFID) system is an embodiment of the radio frequency identification technology using a radio frequency. The RFID system is basically configured by a reader, a transponder called an RFID tag, and a computer or other equipment capable of processing data.

In the RFID system, a tag attached to a movable object to be identified sends a signal including the object's unique information to a reader. The reader receives the signal through the antenna. In this case, a terminal (server) connected to the reader analyzes the received signal to identify information, location, and so on of the object to be identified.

The RFID technology could improve the quality of life of users depending upon the fields to which the RFID technology is applied. For this reason, RFID technology operators have conducted research related to applying the RFID technology to new technical fields.

SUMMARY

An exemplary embodiment provides an apparatus and a method for generating a behavior pattern, and an apparatus and a method for providing related information associated with the behavior pattern based on information from radio frequency identification tags, wherein the behavior pattern of a user is generated by combining belongings of the user to which RFID tags are attached, and information useful to the user is provided based on the behavior pattern.

According to one aspect of an exemplary embodiment, there is provided a method for generating a behavior pattern based on information from radio frequency identification tags. The method includes identifying a plurality of radio frequency identification tags; generating a radio frequency identification group that corresponds to the plurality of radio frequency identification tags; receiving behavior information that corresponds to the radio frequency identification group; and matching the radio frequency identification group with the behavior information, and generating a behavior pattern corresponding to the matched radio frequency identification group and the behavior information, and storing the behavior pattern. The behavior information may be received from a user device and the behavior pattern may be stored in a database.

According to another aspect of an exemplary embodiment, there is provided an apparatus for generating a behavior pattern based on information from radio frequency identification tags. The apparatus includes an identifier configured to identify a plurality of radio frequency identification tags, a controller configured to generate a radio frequency identification group that corresponds to the plurality of radio frequency identification tags, receive behavior information that corresponds to the radio frequency identification group, match the radio frequency identification group with the behavior information, generate a behavior pattern corresponding to the matched radio frequency identification group and the behavior information, and perform an operation to store the behavior pattern. The behavior information may be received from a user device and the behavior pattern may be stored in a database.

According to another aspect of an exemplary embodiment, there is provided an information providing method based on information from radio frequency identification tags. The method includes identifying at least two from among a plurality of radio frequency identification tags; generating a radio frequency identification group that corresponds to the at least two from among the plurality of radio frequency identification tags; receiving behavior information that corresponds to the radio frequency identification group; matching the radio frequency identification group with the behavior information, and generating a behavior pattern corresponding to the matched radio frequency identification group and the behavior information, storing the behavior pattern; and extracting related information associated with the behavior pattern, and providing the related information to the user device if the at least two from among the plurality of radio frequency identification tags are identified. The behavior information may be received from a user device and the behavior pattern may be stored in a database.

According to another aspect of an exemplary embodiment, there is provided an apparatus for providing information based on information from radio frequency identification tags. The apparatus includes an identifier configured to identify at least two from among a plurality of radio frequency identification tags, a controller configured to generate a radio frequency identification group that corresponds to the at least two from among the plurality of radio frequency identification tags, receive behavior information that corresponds to the radio frequency identification group, match the radio frequency identification group with the behavior information, generate a behavior pattern corresponding to the matched radio frequency identification group and the behavior information, and perform an operation to store the behavior pattern, and an information provider which extracts related information associated with the behavior pattern, and provides the related information to a user device if the at least two of the plurality of radio frequency identification tags are identified. The behavior information may be received from a user device and the behavior pattern may be stored in a database.

In an exemplary embodiment, the behavior pattern corresponding to the matched radio frequency identification group and the behavior information is stored in the database if the same behavior information is received a predetermined number of times.

In another exemplary embodiment, at least one from among the operations of identifying, generating, receiving and matching is executed for a behavior information collecting period, and the behavior information collecting period is one of a preset period and a period during which the behavior information is collected a preset number of times.

In another exemplary embodiment, a new behavior pattern is generated if a new radio frequency identification group is generated after a period of time to collect the behavior information.

In yet another exemplary embodiment, the new behavior pattern is stored in the database if a same new behavior information is received a predetermined number of times.

In yet another exemplary embodiment, it is possible to patternize behaviors of a user by combining RFID tags attached to belongings of the user to generate RFID groups and collecting behavior information by the RFID groups.

In yet another exemplary embodiment, behaviors of a user are patternized by using RFID tags. Accordingly, when a user goes out after the patternization, the RFID tags of the belongings of the user are identified, and related information useful to execute behavior information corresponding to the identified RFID tags can be provided to the user.

BRIEF DESCRIPTION OF THE DRAWINGS

Non-limiting and non-exhaustive exemplary embodiments will be described in conjunction with the accompanying drawings. Understanding that these drawings depict only some exemplary embodiments and are, therefore, not intended to limit its scope, the disclosure will be described with specificity and detail through use of the accompanying drawings, in which.

DETAILED DESCRIPTION OF EXEMPLARY EMBODIMENTS

Figure 1:
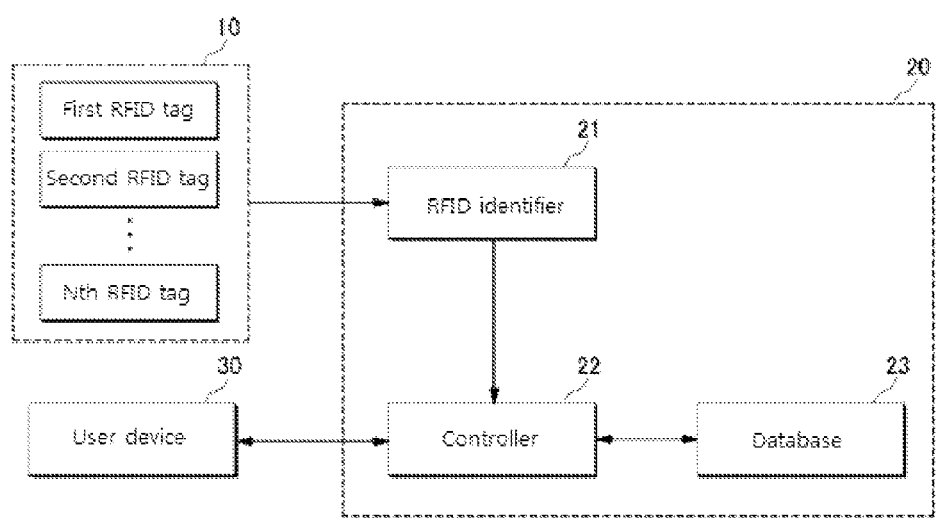
FIG. 1 is a configuration view showing an apparatus for generating a behavior pattern according to an exemplary embodiment.

Hereinafter, exemplary embodiments will be described in detail with reference to the accompanying drawings so that the present disclosure may be readily implemented by those skilled in the art. However, it is to be noted that the present disclosure is not limited to the exemplary embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, processes, operation and/or existence or addition of elements are not excluded in addition to the described components, processes, operation and/or elements.

Hereinafter, illustrative embodiments will be explained in detail with reference to the accompanying drawings.

An exemplary embodiment is directed to a scheme that learns behavior pattern of a user who performs different behaviors depending on his/her belongings, and provides the user with information useful for the behavior pattern when the user goes out carrying the belongings corresponding to the behavior pattern. In the exemplary embodiment, a means (hereinafter, referred to as an "RFID identifier") to identify the RFID tags attached to the belongings of the user may be provided in a house entrance or a car of the user. For convenience in explanation, there will be described the case where the RFID identifier is provided in the house entrance of the user.

Figure 2:
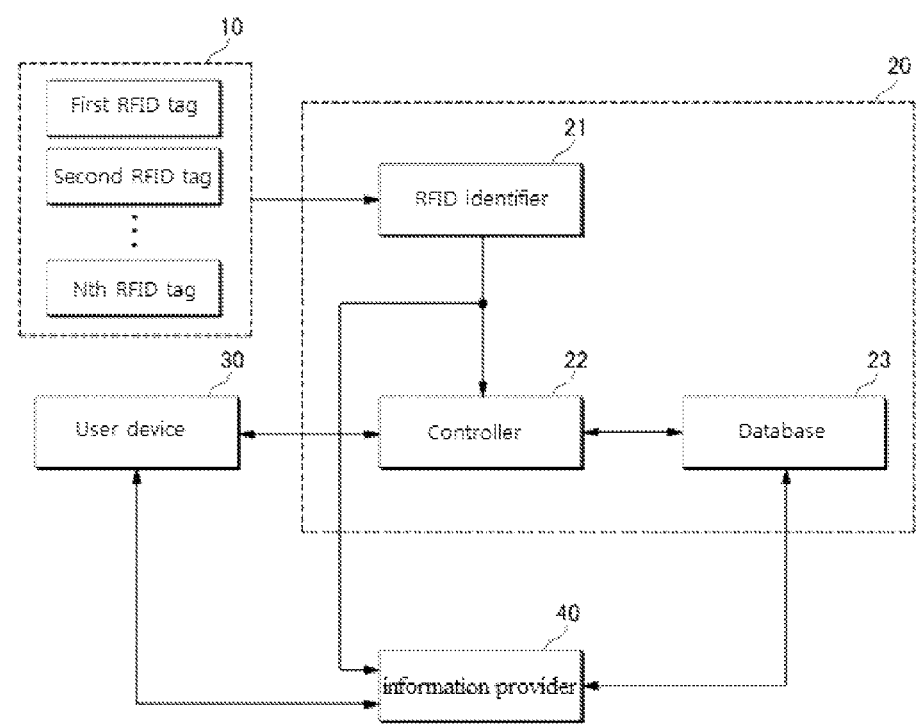
FIG. 2 is a configuration view showing an apparatus for providing related information based on information from radio frequency identification tags, according to an exemplary embodiment.

FIG. 1 is a configuration view showing an apparatus for generating a behavior pattern. FIG. 2 is a configuration view showing an apparatus for providing related information based on information from radio frequency identification tags.

The apparatus for generating a behavior pattern in FIG. 1 may include a plurality of RFID tags 10, a pattern collecting unit 20, and a user device 30. The apparatus for providing related information based on information from radio frequency identification tags in FIG. 2 may further include an information provider 40 in addition to the configuration of the apparatus for generating a behavior pattern in FIG. 1.

As illustrated in FIG. 1, the plurality of RFID tags 10 may be radio frequency identification tags attached to belongings of a user, respectively.

The pattern collecting unit 20 includes an RFID identifier 21, a controller 22, and a database 23.

The RFID identifier 21 receives unique information stored in the plurality of RFID tags 10 and transfers the information to the controller 22. The RFID identifier 21 may be provided in the house entrance of the user and capable of identifying the plurality of RFID tags 10 attached to the belongings of the user when the user goes out. The RFID identifier 21 also may be provided in a car.

The controller 22 is connected to the RFID identifier 21 to generate a behavior pattern of the user for a behavior information collecting period. Here, the behavior information collecting period is a preset period, a period during which the RFID tags are identified, a period during which an RFID group is generated, or a period during which the behavior information is collected a preset number of times. The behavior information collecting period is a period of time to generate behavior pattern of the user for each of the belongings of the user.

To be more specific, the controller 22 generates an RFID group including the identified RFID tags for an RFID tags identifying period.

Here, the RFID tags identifying period is such a short time that the RFID identifier 21 can quickly identify the RFID tags attached to the belongings of the user when the user goes out. The RFID tags identifying period may be a period of time measured in a unit of seconds.

The controller 22 collects the behavior information that corresponds to the RFID group from the user device 30. The behavior information means information related to: belongings the user carries, when the user goes out, which transportation the user takes, where the user is heading, time information related to when the user goes out, movement means (transportation), destination, companion(s), and so on. Furthermore, the behavior information may include information about a companion of the user. In an exemplary embodiment, if there is a companion, information as to whether a destination of the user and a destination of the companion are the same or not may also be stored as behavior information.

When the user goes out, the controller 22 can receive the time information from the user device 30. The controller 22 can identify information about the movement means and the destination of the user from a route of movement of the user device 30 and a place where the movement of the user device 30 is stopped.

The route of the movement of the user device 30 can be identified through a base station or a local area network. Since the route of the movement and the destination of the user device 30 can be identified by using various methods, detailed explanation in this regard is omitted herein.

When the user goes out, the controller 22 may request the behavior information such as the movement means and the destination from the user device 30 in order to directly receive input of the behavior information from the user device 30.

Once the behavior information by the RFID groups is collected as described above, the controller 22 matches the RFID group with the behavior information, generates the behavior pattern corresponding to the matched RFID group and the behavior information, and performs an operation to store the behavior pattern in the database 23, wherein the behavior pattern corresponds to the matched RFID group and the behavior information is stored in the database 23 if the same behavior information is received a predetermined number of times.

Next, the controller 22 generates a new behavior pattern in the above-described operations of receiving and matching if a new radio frequency identification group is generated after the period of time to collect behavior.

As to another method to generate the new behavior pattern, the new behavior pattern is stored in the database if the same new behavior information is received a predetermined number of times.

The database 23 stores the behavior pattern input from the controller 22.

For a behavior information providing period, after the behavior information collecting period, the information provider 40 in FIG. 2 determines whether particular RFID tags identified by the RFID identifier 21 are included in a particular RFID group corresponding to the behavior pattern stored in the database 23. If the particular RFID tags are included in the particular RFID group corresponding to the behavior pattern, the information provider 40 extracts information helpful to execute the behavior information of the particular RFID group (related information) associated with the behavior pattern, and provides the related information to the user device 30.

For example, if the behavior information of the particular RFID group is related to 7:00 a.m. on weekdays, a bus, and a work office, the information provider 40 may provide a bus service route from the house of the user to the work office to the user device 30. Here, in the event that there is a traffic jam in the bus service route, the information provider 40 may provide a notification of the traffic jam to the user device 30.

In another example, if the behavior information of the particular RFID group is related to 9:00 on Sunday, a car, and a bookstore, the information provider 40 may provide a car driving route from the house of the user to the bookstore, to the user device 30. Here, the information provider 40 may provide book information such as a new book and a best-selling book, to the user device 30.

As described above, in an exemplary embodiment, once the behavior pattern of the user is extracted, various information can be provided to the user device based on the extracted behavior pattern.

In an exemplary embodiment, if the RFID tags identified by the RFID identifier 21 are some of the plurality of RFID tags, provider 40 notifies the user device 30 of the remaining plurality of RFID tags.

For example, if RFID tags of a first RFID group in a behavior pattern are related to a car key, a wallet, and a mobile phone, and behavior information of the first RFID group is related to 7:00 a.m. on weekdays, a bus, and a work office, in the event that the RFID identifier 21 only identifies the RFID tags related to the car key, and the mobile phone at 7:00 a.m. on weekdays, the information provider 40 may send notification to the user device 30 of the missing wallet.

The information provider 40 may notify the user of the other plurality of RFID tags through a speaker.

Figure 3:
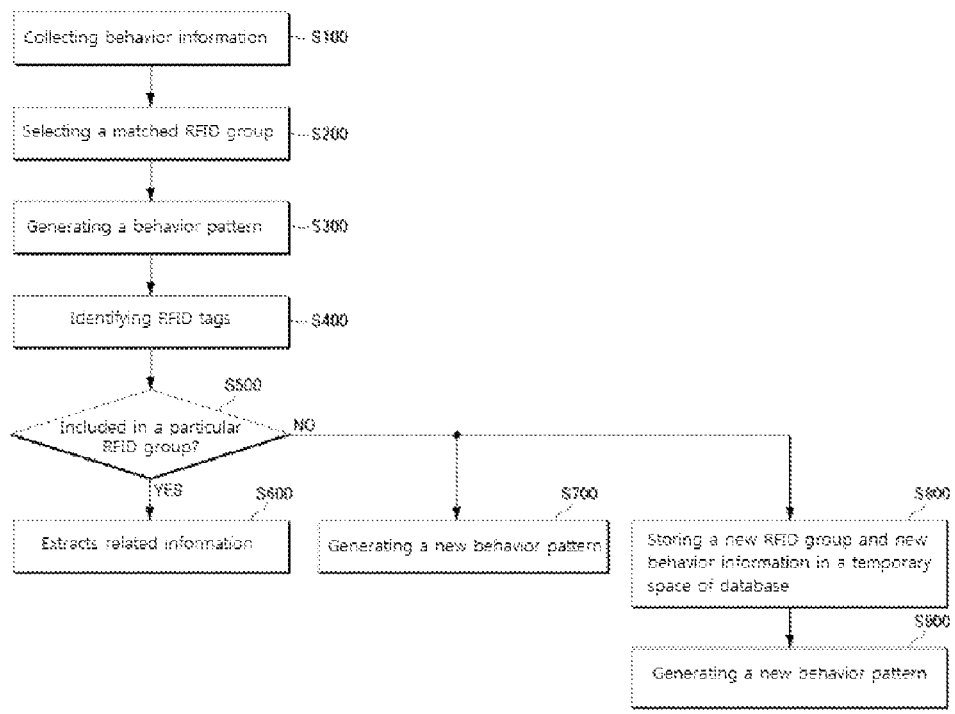
FIG. 3 is a flowchart showing a method for providing related information based on information from radio frequency identification tags according to an exemplary embodiment.
Figure 4:
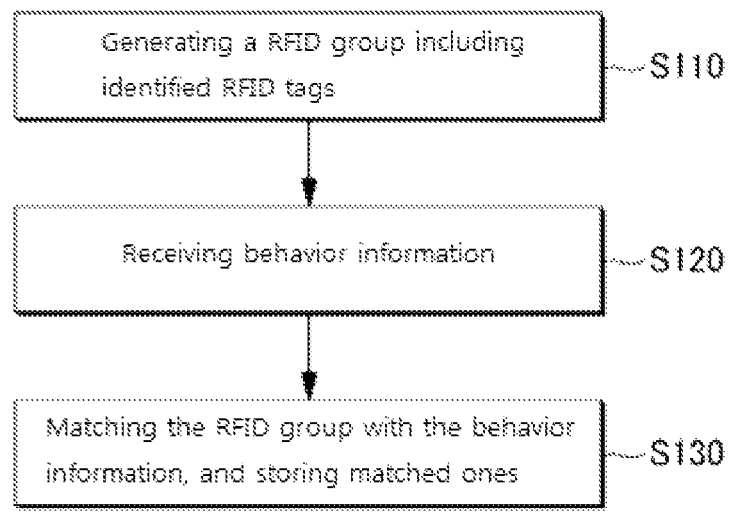
FIG. 4 is a flowchart showing the operation collecting behavior information in FIG. 3.

FIG. 3 is a flowchart showing a method for providing related information based on information from radio frequency identification tags. According to an exemplary embodiment. FIG. 4 is a flowchart showing the operation collecting behavior information in FIG. 3.

In FIG. 3, it is assumed that information about which belongings of the user RFID tags are attached is pre-stored in the pattern collecting unit 20.

As illustrated in FIG. 3, for the behavior information collecting period, the controller 22 generates an RFID group including the identified RFID tags for the RFID tags identifying period, and collects the behavior information that corresponds to the RFID group from the user device 30 (S100).

To be more specific, as illustrated in FIG. 4, the operation (S100) of collecting behavior information includes operation (S110) of generating the RFID group including the identified RFID tags for the RFID tags identifying period, operation (S120) of receiving the behavior information that corresponds to the RFID group from the user device 30, and operation (S130) of matching the RFID group with the behavior information, and storing the matched RFID group and the behavior information in the database 23.

Next, in FIG. 3, the controller 22 selects the matched RFID group, if the same behavior information corresponding to the matched RFID group is received a predetermined number of times (S200). The controller 22 generates the behavior pattern corresponding to the matched RFID group and the behavior information, and performs an operation to store the behavior pattern in the database 23 (S300).

For the behavior information providing period after the behavior information collecting period, the RFID identifier 21 identifies the RFID tags attached to the belongings of the user (S400). The information provider 40 determines whether the identified RFID tags are included in a particular RFID group corresponding to the behavior pattern stored in the database 23 (S500).

If the identified RFID tags are included in the particular RFID group corresponding to the behavior pattern stored in the database 23, the information provider 40 extracts related information associated with the behavior pattern, and provides the related information to the user device 30 (S600).

To be more specific, if behavior information of an RFID group including a user and companion (son or daughter) of the user is related to the morning of weekdays, a car, a school, and a work office, the information provider 40 provides an optimum route and navigation from the house of the user to the school to a user device 30. The related information may be helpful to execute the behavior information of the RFID group of the user and the companion. In this case, the information provider 40 may provide a navigation route from the house of the user to the work office, which may include passing by the above-mentioned school. In consideration of a traffic status of a movement route, the information provider 40 may provide information of a detour or public transportation.

As described above, in an exemplary embodiment, by generating a plurality of RFID tags as an RFID group, behavior information of the user is patterned by groups. Thereafter, when the user goes out, useful information (related information) with regard to the behavior pattern can be provided to the user device 30.

In operation S500, if the identified RFID tags are not included in a particular RFID group stored in the database 23, the controller 22 generates a new behavior pattern by the operations of generating a new RFID group and receiving new behavior information and matching the new RFID group with the new behavior information (S700).

As to an alternative, in operation S500, if the identified RFID tags are not included in a RFID group stored in the database 23, the controller 22 stores a new RFID group and new behavior information in a temporary space of the database 23 (S800).

The new behavior pattern is generated and stored in the database if the same new behavior information is received a predetermined number of times (S900).

As described above, in an exemplary embodiment, behavior information of the user can be patternized by using RFID tags. Furthermore, the new behavior pattern stored in the database 23 can be generated depending on the new behavior information of the user after the patternization.

Assuming that, in the above-described operation (S500), the particular RFID group corresponding to the behavior pattern includes three RFID tags, in the event that the RFID identifier 21 identifies two of the RFID tags, the information provider 40 notifies the user device of the remaining radio frequency identification tag. Through the notification, the user identifies the belonging that the user leaves at home and takes all necessary belongings.

In the above-described operation (S600), if the destination of the user and the destination of the companion are different, it is possible to provide route information that is satisfactory to both the destinations of the user and the companion.

The exemplary embodiment can be embodied in a storage medium including instruction codes executable by a computer such as a program module executed by the computer. Also, the data structure according to an exemplary embodiment, can be stored in the storage medium executable by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes a certain information transmission medium.

The above description is provided for the purpose of illustration, and it would be understood by those skilled in the art that various changes and modifications may be made without changing technical conception and essential features of exemplary embodiments. Thus, it is clear that the above-described embodiments are exemplary in all aspects and do not limit the present invention concept. For example, each component described to be of a single type can be implemented in a distributed manner. Likewise, components described to be distributed can be implemented in a combined manner.

The scope of certain aspects of exemplary embodiments is defined by the following claims rather than by the detailed description of the exemplary embodiment. It shall be understood that all modifications and exemplary embodiments conceived from the meaning and scope of the claims and their equivalents are included in the scope of the present disclosure.

What is claimed is:

1. A method for generating a behavior pattern based on information from radio frequency identification tags, the method comprising:
   identifying a plurality of radio frequency identification tags;
   generating a radio frequency identification group that corresponds to the plurality of radio frequency identification tags;
   receiving behavior information that corresponds to the radio frequency identification group;
   matching the radio frequency identification group with the behavior information, and generating a behavior pattern corresponding to the matched radio frequency identification group and the behavior information, and storing the behavior pattern; and
   notifying a user device of remaining radio frequency identification tags from among the plurality of radio frequency identification tags when only a portion of the plurality of radio frequency identification tags is identified.

2. The method of claim 1, wherein the behavior information is received, at another device, from a user device and the behavior pattern is stored in a database.

3. The method of claim 1, wherein the behavior pattern corresponding to the matched radio frequency identification group and the behavior information is stored in the database if the same behavior information is received a predetermined number of times.

4. The method of claim 1, wherein at least one from among the operations of identifying, generating, receiving and matching is executed for a behavior information collecting period, and
   the behavior information collecting period is one of a preset period and a period during which the behavior information is collected a preset number of times.

5. The method of claim 1, further comprising:
   generating a new behavior pattern if a new radio frequency identification group is generated after a period of time to collect the behavior information.

6. The method of claim 5, wherein the new behavior pattern is stored in the database if a same new behavior information is received a predetermined number of times.

7. An apparatus for generating a behavior pattern based on information from radio frequency identification tags, the apparatus comprising:
   an identifier configured to identify a plurality of radio frequency identification tags; and
   a controller configured to generate a radio frequency identification group that corresponds to the plurality of radio frequency identification tags, receive behavior information that corresponds to the radio frequency identification group, match the radio frequency identification group with the behavior information, generate a behavior pattern corresponding to the matched radio frequency identification group and the behavior information, and perform an operation to store the behavior pattern,
   wherein a user device is notified of remaining radio frequency identification tags from among the plurality of radio frequency identification tags when some of the plurality of radio frequency identification tags are identified.

8. The apparatus of claim 7, wherein the behavior information is received from a user device and the behavior pattern is stored in a database.

9. The apparatus of claim 7, wherein the behavior pattern corresponding to the matched radio frequency identification group and the behavior information is stored in the database if a same behavior information is received a predetermined number of times.

10. The apparatus of claim 7, wherein at least one from among the operations of identifying, generating, receiving and matching of the controller is executed for a behavior information collecting period, and
the behavior information collecting period is one of a preset period and a period during which the behavior information is collected a preset number of times.

11. The apparatus of claim 7, wherein the controller generates a new behavior pattern if a new radio frequency identification group is generated after a period of time to collect the behavior information.

12. An information providing method based on information from radio frequency identification tags, the method comprising:
identifying at least two from among a plurality of radio frequency identification tags;
generating a radio frequency identification group that corresponds to the at least two from among the plurality of radio frequency identification tags;
receiving behavior information that corresponds to the radio frequency identification group;
matching the radio frequency identification group with the behavior information, and generating a behavior pattern corresponding to the matched radio frequency identification group and the behavior information, and storing the behavior pattern;
extracting related information associated with the behavior pattern, and providing the related information to a user device if the at least two of the plurality of radio frequency identification tags is identified; and
notifying the user device of remaining radio frequency identification tags from among the plurality of radio frequency identification tags when only a portion of the plurality of radio frequency identification tags is identified.

13. The method of claim 12, wherein the behavior information is received, at another device, from a user device and the behavior pattern is stored in a database.

14. The method of claim 12, wherein the behavior pattern corresponding to the matched radio frequency identification group and the behavior information is stored in the database if the same behavior information is received a predetermined number of times.

15. The method of claim 12, wherein at least one from among the operations of identifying, generating, receiving and matching is executed for a behavior information collecting period, and
the behavior information collecting period is one of a preset period and a period during which the behavior information is collected a preset number of times.

16. The method of claim 12, further comprising:
generating a new behavior pattern if a new radio frequency identification group is generated after a period of time to collect the behavior information.

17. An apparatus for providing information based on information from radio frequency identification tags, the apparatus comprising:
an identifier configured to identify at least two from among a plurality of radio frequency identification tags;
a controller configured to generate a radio frequency identification group that corresponds to the at least two from among the plurality of radio frequency identification tags, receive behavior information that corresponds to the radio frequency identification group, match the radio frequency identification group with the behavior information, generate a behavior pattern corresponding to the matched radio frequency identification group and the behavior information, and perform an operation to store the behavior pattern; and
an information provider which extracts related information associated with the behavior pattern, and provides the related information to a user device if the at least two from among the plurality of radio frequency identification tags are identified,
wherein the information provider notifies the user device of remaining radio frequency identification tags from among the plurality of radio frequency identification tags when some of the plurality of radio frequency identification tags are identified.

18. The apparatus of claim 17, wherein the behavior information is received from a user device and the behavior pattern is stored in a database.

19. The apparatus of claim 17, wherein the behavior pattern corresponding to the matched radio frequency identification group and the behavior information is stored in the database if a same behavior information is received a predetermined number of times.

20. The apparatus of claim 17, wherein the controller generates a new behavior pattern if a new radio frequency identification group is generated after a period of time to collect behavior.

* * * * *